United States Patent
Yoo et al.

(10) Patent No.: US 11,173,481 B2
(45) Date of Patent: Nov. 16, 2021

(54) METAL SINGLE-ATOM CATALYST AND METHOD FOR PREPARING THE SAME

(71) Applicants: KOREA INSTITUTE OF SCIENCE AND TECHNOLOGY, Seoul (KR); GLOBAL FRONTIER CENTER FOR MULTISCALE ENERGY SYSTEMS, Seoul (KR)

(72) Inventors: Sung Jong Yoo, Seoul (KR); Injoon Jang, Seoul (KR); Hee-Young Park, Seoul (KR); So Young Lee, Seoul (KR); Hyun Seo Park, Seoul (KR); Jin Young Kim, Seoul (KR); Jong Hyun Jang, Seoul (KR); Hyoung-Juhn Kim, Seoul (KR)

(73) Assignees: Korea Institute of Science and Technology, Seoul (KR), part interest; Global Frontier Center for Multiscale Energy Systems, Seoul (KR), part interest ( * ) Notice: Subject to any disclaimer, the term of this patent is extended or adjusted under 35 U.S.C. 154(b) by 189 days.

(21) Appl. No.: 16/534,216

(22) Filed: Aug. 7, 2019

(65) Prior Publication Data
US 2020/0230589 A1 Jul. 23, 2020

(30) Foreign Application Priority Data
Jan. 18, 2019 (KR) .......... 10-2019-0006667

(51) Int. Cl.
*B01J 37/34* (2006.01)
*B01J 23/50* (2006.01)
(Continued)

(52) U.S. Cl.
CPC ............. *B01J 37/34* (2013.01); *B01J 23/50* (2013.01); *B01J 23/52* (2013.01); *B01J 37/0209* (2013.01);
(Continued)

(58) Field of Classification Search
CPC ........ B01J 23/50; B01J 23/52; B01J 37/0209; B01J 37/34; B01J 23/48; B01J 37/344;
(Continued)

(56) References Cited

U.S. PATENT DOCUMENTS 6,040,077 A * 3/2000 Debe .......... B01J 23/42
429/524
2005/0263163 A1* 12/2005 Yadav .......... A24C 5/005
131/334
(Continued)

FOREIGN PATENT DOCUMENTS

KR   10-2011-0046999 A   5/2011
KR   10-2014-0100613 A   8/2014
KR   10-2017-0065065 A   6/2017

OTHER PUBLICATIONS

Zhang (Porous Carbon Supports: Recent Advances with Various Morphologies and Compositions, ChemCatChem, 2015, 7, p. 2788-2805).*
(Continued)

*Primary Examiner* — Jun Li
(74) *Attorney, Agent, or Firm* — Rabin & Berdo, P.C.

(57) ABSTRACT

Disclosed are a metal single-atom catalyst and a method for preparing the same. The method uses a minimal amount of chemicals and is thus environmentally friendly compared to conventional chemical and/or physical methods. In addition, the method enables the preparation of a single-atom catalyst in a simple and economical manner without the need for further treatment such as acid treatment or heat treatment.
(Continued)

Furthermore, the method is universally applicable to the preparation of single-atom catalysts irrespective of the kinds of metals and supports, unlike conventional methods that suffer from very limited choices of metal materials and supports. Therefore, the method can be widely utilized to prepare various types of metal single-atom catalysts. All metal atoms in the metal single-atom catalyst can participate in catalytic reactions. This optimal atom utilization achieves maximum reactivity per unit mass and can minimize the amount of the metal used, which is very economical.

1 Claim, 4 Drawing Sheets

(51) Int. Cl.
    *B01J 23/52*     (2006.01)
    *B01J 37/02*     (2006.01)
    *H01M 4/90*     (2006.01)
    *H01M 4/88*     (2006.01)

(52) U.S. Cl.
    CPC .......... *B01J 37/0217* (2013.01); *B01J 37/344* (2013.01); *H01M 4/8871* (2013.01); *H01M 4/9041* (2013.01); *H01M 4/9075* (2013.01); *H01M 4/9083* (2013.01)

(58) Field of Classification Search
    CPC ............. H01M 4/9041; H01M 4/9075; H01M 4/9083; H01M 4/8871
    See application file for complete search history.

(56) References Cited

U.S. PATENT DOCUMENTS

| | | | | |
|---|---|---|---|---|
| 2011/0104588 | A1* | 5/2011 | Kwon | H01M 4/92 |
| | | | | 429/524 |
| 2012/0004098 | A1* | 1/2012 | Xiao | B01J 23/8913 |
| | | | | 502/185 |
| 2014/0221192 | A1* | 8/2014 | Yoo | H01M 4/926 |
| | | | | 502/5 |
| 2015/0239918 | A1* | 8/2015 | Johnson | B01J 21/18 |
| | | | | 424/9.1 |

OTHER PUBLICATIONS

Albert Bruix et al., "Maximum Noble-Metal Efficiency in Catalytic Materials: Atomically Dispersed Surface Platinum", Angew. Chem. Int. Ed., 2014, p. 10525-10530, vol. 53.

* cited by examiner

METAL SINGLE-ATOM CATALYST AND METHOD FOR PREPARING THE SAME

CROSS-REFERENCE TO RELATED APPLICATIONS

This application claims priority under 35 U.S.C. § 119 to Korean Patent Application No. 10-2019-0006667 filed on Jan. 18, 2019 in the Korean Intellectual Property Office, the disclosure of which is incorporated herein by reference in its entirety.

BACKGROUND OF THE INVENTION

1. Field of the Invention

The present invention relates to a metal single-atom catalyst and a method for preparing the same.

2. Description of the Related Art

There have recently been reports on successful synthesis of various types of single-atom catalysts. Such catalysts have attracted a lot of attention because all atoms can participate in catalytic reactions, resulting in a considerable increase in reactivity per unit mass. Single-atom catalysts have been demonstrated to be promising materials in energy conversion and chemical transformation due to their catalytic activity resulting from their optimal atom utilization and unique quantum effect. Generally, increasing the density and intrinsic activity of active sites is a major strategy to improve the performance of many catalytic systems. Single-atom catalysts, with single metal atoms dispersed on or fixed to supports, are currently the most important catalytic systems due to their maximum atom efficiency, unsaturated active sites, and well-defined reaction mechanisms.

The following two strategies are usually used to improve the performance of single-atom catalysts: 1) increasing the metal loading of single-atom catalysts through the choice of appropriate supports; and 2) increasing the intrinsic activity of single-atom catalysts. Based on these approaches, rapid advances and extensive investigations have been made in the field of single-atom catalysts.

Single-atom catalysts are synthesized under very limited conditions compared to nanoparticle catalysts due to the inherent instability of the single atoms caused by the low coordination number and high surface energy of the single atoms. For example, single-atom catalysts are prepared using limited kinds of metals by limited synthetic methods. In attempts to overcome these limitations, various bottom-up or top-down strategies have been employed for the synthesis of single-atom catalysts. However, there are still many difficulties in synthesizing single-atom catalysts due to low yield, low metal loading, heterogeneous single atoms, and the need for complicated or expensive equipment. Another problem of most methods for the synthesis of single-atom catalysts based on the use of chemicals is harmfulness to the environment. Such problems seriously impede further studies on potential applications of single-atom catalysts, particularly at the industrial level.

As a solution to these problems, there is a need to develop methods for the synthesis of high-density metal single atoms and single-atom catalysts having well-defined single-atom structures in a simple and environmentally friendly manner.

PRIOR ART DOCUMENTS

Patent Documents (Patent Document 1) Korean Patent Publication No. 10-2017-0065065

SUMMARY OF THE INVENTION

Therefore, the present invention intends to provide a method for producing metal single atoms and a method for preparing a metal single-atom catalyst that are free from the above-mentioned problems (e.g., limited kinds of metals and supports, complex procedure, and environmental and cost problems) encountered in conventional methods for preparing metal single-atom catalysts.

One aspect of the present invention is directed to a method for preparing a metal single-atom catalyst, including (a) depositing metal single atoms on a water-soluble support, (b) dispersing the water-soluble support deposited with the metal single atoms and a support, followed by stirring to obtain a dispersion containing a metal single-atom catalyst loaded on the support, and (c) separating the metal single-atom catalyst from the dispersion.

Another aspect of the present invention is directed to a metal single-atom catalyst including a support and metal single atoms dispersed and loaded on the support.

The method of the present invention uses a minimal amount of chemicals and is thus environmentally friendly compared to conventional chemical and/or physical methods. In addition, the method of the present invention enables the preparation of a single-atom catalyst in a simple and economical manner without the need for further treatment such as acid treatment or heat treatment. Furthermore, the method of the present invention is universally applicable to the preparation of single-atom catalysts irrespective of the kinds of metals and supports, unlike conventional methods that suffer from very limited choices of metal materials and supports. Therefore, the method of the present invention can be widely utilized to prepare various types of metal single-atom catalysts.

All metal atoms in the metal single-atom catalyst of the present invention can participate in catalytic reactions. This optimal atom utilization achieves maximum reactivity per unit mass and can minimize the amount of the metal used, which is very economical.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Figure 1:
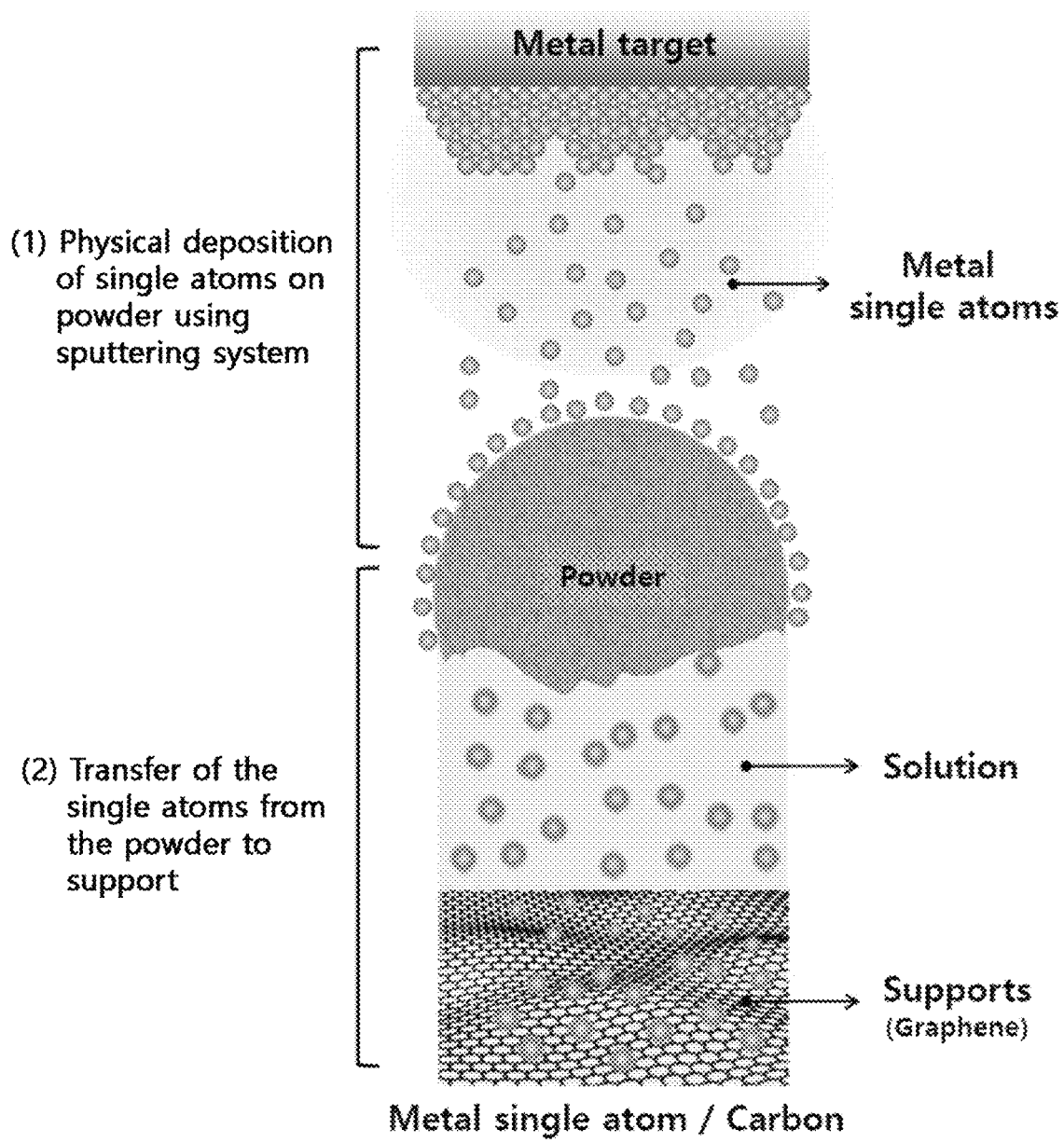
FIG. 1 is a diagram illustrating a method for synthesizing supported single atoms using a physical deposition technique according to one embodiment of the present invention.

Several aspects and various embodiments of the present invention will now be described in more detail.

One aspect of the present invention provides a method for preparing a metal single-atom catalyst, including (a) depositing metal single atoms on a water-soluble support, (b) dispersing the water-soluble support deposited with the metal single atoms and a support, followed by stirring to obtain a dispersion containing a metal single-atom catalyst loaded on the support, and (c) separating the metal single-atom catalyst from the dispersion.

Recently, single-atom catalysts have been demonstrated to be promising materials in energy conversion and chemical transformation due to their catalytic activity resulting from their optimal atom utilization and unique quantum effect. Single-atom catalysts have attracted a lot of attention because their reactivity per unit mass is maximized.

The method of the present invention enables the preparation of a metal single-atom catalyst in a simple manner through the deposition of metal single atoms on a water-soluble support by physical vapor deposition and the transfer of the deposited metal single atoms to a support. In addition, the method of the present invention can provide a solution to the problems (e.g., low yield and heterogeneous single atoms) encountered in conventional methods for synthesizing single-atom catalysts.

Furthermore, unlike conventional methods for preparing metal single-atom catalysts that suffer from very limited choices of metal materials and supports, the method of the present invention is of great significance due to its applicability to the preparation of single-atom catalysts irrespective of the kinds of metals and supports. Moreover, the method of the present invention does not require the use of expensive equipment and is thus economical. The method of the present invention uses a minimal amount of chemicals and is thus environmentally friendly.

According to one embodiment, the metal may be selected from platinum, gold, palladium, cobalt, silver, rhodium, iridium, ruthenium, nickel, iron, copper, manganese, vanadium, chromium, molybdenum, yttrium, lanthanum, cerium, zirconium, titanium, tantalum, and osmium.

As described above, any kind of metal material may be used without problems in the preparation of a metal single-atom catalyst according to the method of the present invention. The kind of the metal is merely illustrative and the majority of naturally occurring metals may be used in the method of the present invention.

According to a further embodiment, the method may further include drying the water-soluble support under vacuum before step (a).

According to another embodiment, the water-soluble support may be selected from: sugar powders, including glucose, sucrose, and fructose powders; water-soluble metal salt powders, including sodium chloride, potassium chloride, and sodium bicarbonate powders; water-soluble polymer powders, including PVA and PVP powders; nitrogen-containing carbonaceous materials, including glucosamine, cyanamide, urea, melamine, dopamine, pyrrole, aniline, kinetin, L-alanine, and L-serine; sulfur-containing carbonaceous materials, including cysteine, allicin, alliin, and ajoene; phosphorus-containing carbonaceous materials, including tri(O-tolyl)phosphine, tributylphosphine oxide, tris(dimethylamine)phosphine, trioctylphosphine, trioctylphosphine oxide, and triphenylphosphine; and mixtures of two or more thereof, but is not limited thereto.

According to a further embodiment, the metal may be selected from gold and silver and the water-soluble support may be selected from: nitrogen-containing carbonaceous materials, including glucosamine, cyanamide, urea, melamine, dopamine, pyrrole, aniline, kinetin, L-alanine, and L-serine; sulfur-containing carbonaceous materials, including cysteine, allicin, alliin, and ajoene; phosphorus-containing carbonaceous materials, including tri(O-tolyl)phosphine, tributylphosphine oxide, tris(dimethylamine)phosphine, trioctylphosphine, trioctylphosphine oxide, and triphenylphosphine; and mixtures of two or more thereof.

It was found empirically that metals such as platinum, cobalt, nickel and iron are readily deposited irrespective of the kind of the water-soluble support and the resulting deposited single atoms can be transferred to supports.

Meanwhile, metals such as gold and silver are not readily deposited on water-soluble supports because their single atoms are very actively diffused, with the result that a desired amount of the metal single atoms may not be deposited on supports or aggregation of the metal single atoms may occur.

However, the use of a nitrogen-, sulfur-, phosphorus- or boron-containing carbonaceous material as the water-soluble support in the method of the present invention prevents the single atoms from diffusing because the nitrogen, sulfur, phosphorus or boron in the carbonaceous material forms coordinate covalent bonds with the deposited single atoms, facilitating the deposition of the single atoms and enabling more effective preparation of a metal single-atom catalyst.

According to another embodiment, the support may be selected from carbon-based materials, including carbon black, carbon nanotubes, and graphene, and metal oxides, including titanium dioxide, silica, and alumina.

The method of the present invention is based on physical deposition of metal single atoms on a support and is advantageously applicable to the preparation of a metal single-atom catalyst irrespective of the kinds of the catalytic metal and the support used, unlike conventional methods for preparing catalysts based on chemical synthesis. Thus, according to the method of the present invention, a metal single-atom catalyst can be prepared by suitably selecting the catalytic metal and the support according to the intended application. For example, the method of the present invention enables the preparation of a catalyst for oxygen reduction reaction in which platinum single atoms are supported on carbon black or a catalyst for petroleum desulfurization in which molybdenum single atoms are supported on silica.

According to another embodiment, the dispersion solvent may be anhydrous ethanol.

It was found that a much higher proportion of the metal single atoms are loaded on the support when anhydrous ethanol is used as the dispersion solvent than when other solvents are used. This is because anhydrous ethanol having very low solubility for the water-soluble support prevents the water-soluble support present at a high concentration in the dispersion from impeding the loading of the metal single atoms on the support.

According to another embodiment, the deposition may be performed by a suitable technique selected from sputtering, thermal evaporation, E-beam evaporation, and atomic layer deposition.

According to another embodiment, the deposition may be performed by sputtering, the sputtering may be radio frequency magnetron sputtering, the sputtering working pressure may be between 0.1 and 1 mTorr, and the intensity of the sputtering power may be between 1 and 10 W. The sputtering working pressure is preferably between 0.3 and 0.7 mTorr and the intensity of the sputtering power is preferably between 3 and 7 W. The sputtering working pressure is more preferably between 0.4 and 0.6 mTorr and the intensity of the sputtering power is more preferably between 4 and 6 W.

The present inventors have conducted research aimed at depositing nanoparticles of a catalytic material on a support (e.g., glucose) by sputtering and transferring the nanoparticles to another support to load the nanoparticles on the support. After further research, the present inventors found that metal single atoms rather than metal nanoparticles can be deposited under specific sputtering conditions and a catalyst supported by the single atoms can be prepared.

The sputtering conditions (for example, sputtering time and temperature) can be appropriately controlled depending on the type of the support on which the metal single atoms are deposited and the deposition rate of the metal single atoms, but it is preferred that the sputtering working pressure and the sputtering power are maintained within the respective ranges defined above for uniform deposition of the single atoms at high density and utilization of the deposited single atoms.

The synthesis of a single-atom catalyst with high performance by deposition of the single atoms on the water-soluble support and uniform loading of the deposited single atoms on the catalyst support at high density requires appropriate control over the mobility of the single atoms. The sputtering working pressure and sputtering power ranges defined above are largely different from those (particularly the sputtering power) usually used in the art and are advantageous in suitably controlling the mobility of the single atoms such that the single atoms are uniformly loaded at high density.

The working pressure refers to an internal pressure of a sputtering chamber that is created by feeding an inert gas into the sputtering chamber maintained under vacuum in the initial stage. The working pressure is maintained slightly higher than the initial vacuum pressure.

The sputtering power refers to a power used for sputtering. The sputtering power range defined above corresponds to a power density of 0.05 to 0.5 W/cm$^2$. The power density is calculated by dividing the sputtering power by the area of a sputtering target used.

If the sputtering is performed at a working pressure or a power outside the corresponding range defined above, nanoparticles as aggregates of atoms may be produced from the metal target. Even if produced, the metal single atoms migrate rapidly, with the result that they may be deposited at low density or non-uniformly and may aggregate.

There is no restriction on the sputtering technique. For example, the sputtering may be selected from direct-current (DC) magnetron sputtering or radio frequency (RF) magnetron sputtering. The sputtering is preferably RF magnetron sputtering. DC sputtering is advantageous over RF magnetron sputtering in that a large amount of metal single atoms can be deposited in a short time. However, RF magnetron sputtering is preferred that can control the mobility of the single atoms to a predetermined level to induce uniform deposition of the single atoms while avoiding aggregation of the single atoms.

According to another embodiment, the deposition by sputtering may be performed simultaneously with stirring of the water-soluble support such that the metal single atoms are deposited uniformly over the entire surface of the water-soluble support.

Figure 2:
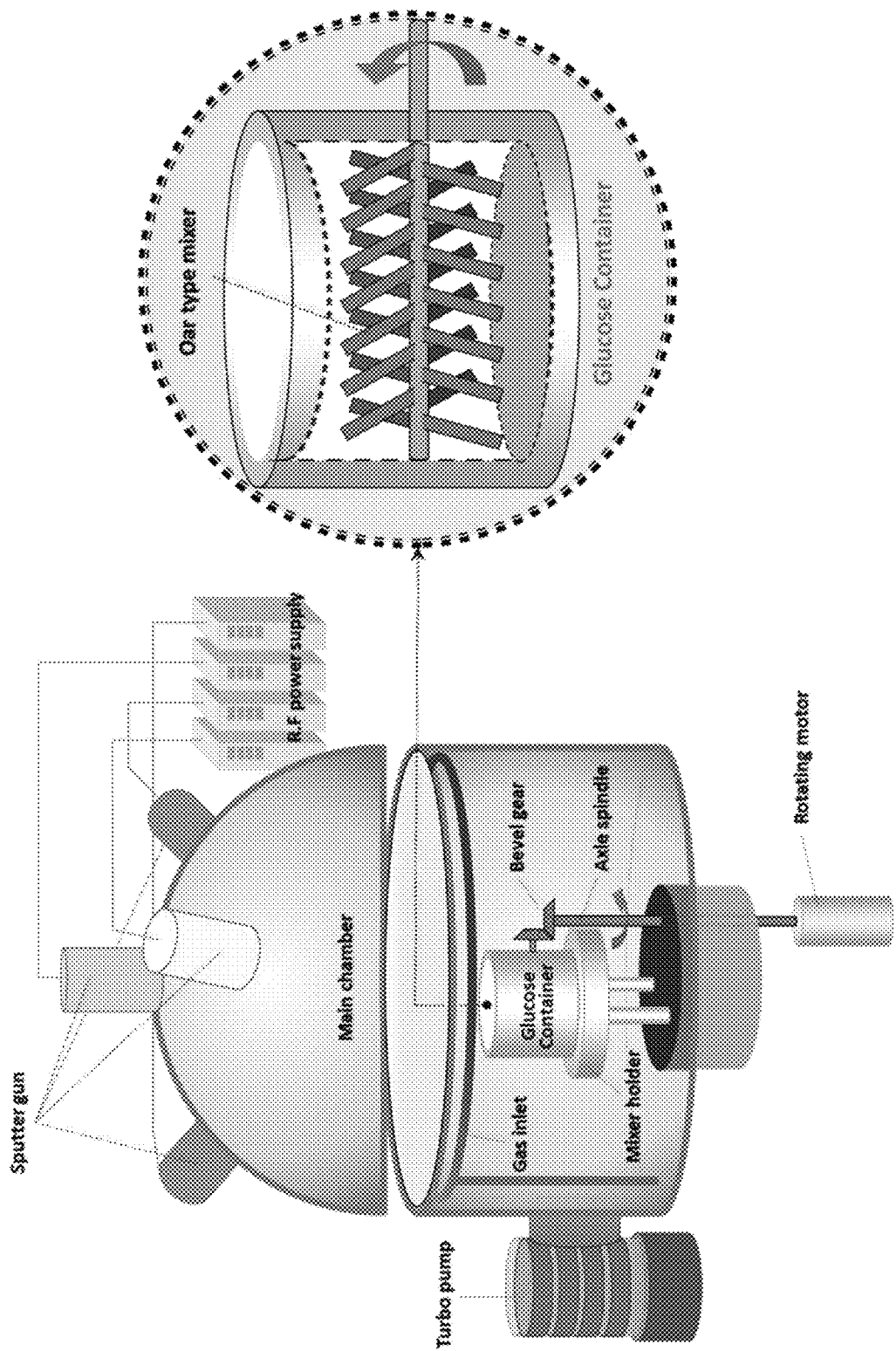
FIG. 2 is a diagram illustrating a sputtering system for depositing single atoms on a glucose powder in accordance with one embodiment of the present invention.

A conventional sputtering system can be modified for use in the present invention. In this case, a stirrer is installed at a location where the substrate is placed. A modified sputtering system according to one embodiment of the present invention is schematically shown in FIG. 2. Referring to FIG. 2, the sputtering system is designed such that the water-soluble support is placed in the stirrer and sputtering is performed simultaneously with stirring. Due to this design, the metal single atoms can be uniformly deposited over the entire surface of the water-soluble support.

According to another embodiment, in step (c), the dispersion containing a metal single-atom catalyst loaded on the carbon support may be filtered, washed with distilled water, and dried to separate the metal single-atom catalyst loaded on the support.

For example, after the stirring, the dispersion may be filtered through a filter paper, washed with distilled water to remove the remaining water-soluble support, and dried in a vacuum oven at 50 to 100° C. for 30 minutes to 24 hours.

According to another embodiment, the metal single-atom catalyst may be selected from catalysts for polymer electrolyte membrane fuel cells (PEMFCs), catalysts for phosphoric acid fuel cells (PAFCs), catalysts for alkaline exchange membrane fuel cells (AEMFCs), catalysts for oxygen reduction reaction, catalysts for hydrogen evolution reaction, catalysts for carbon dioxide reduction, catalysts for artificial photosynthesis, and catalysts for electrochemical synthesis, but is not limited thereto. The kinds of the metal and the support of the catalyst may be appropriately selected according to the intended application.

For example, the catalyst may be a catalyst for petroleum desulfurization in which molybdenum single atoms are supported on silica or a catalyst for oxygen reduction reaction in which platinum single atoms are supported on carbon black.

According to another embodiment, the deposition may be performed by sputtering, the sputtering may be RF magnetron sputtering, the intensity of the sputtering power may be between 1 and 10 W, the dispersion solvent may be anhydrous ethanol, and the water-soluble support may be selected from nitrogen-containing carbonaceous materials, including glucosamine, cyanamide, urea, melamine, dopamine, pyrrole, aniline, kinetin, L-alanine, and L-serine, sulfur-containing carbonaceous materials, including cysteine, allicin, alliin, and ajoene, phosphorus-containing carbonaceous materials, including tri(O-tolyl)phosphine, tributylphosphine oxide, tris(dimethylamine)phosphine, trioctylphosphine, trioctylphosphine oxide, and triphenylphosphine, and mixtures of two or more thereof.

When the above conditions are all met, a very large amount of the metal single atoms can be uniformly supported within the error range permissible for transmission electron microscopy.

The intensity of the sputtering power within the range defined above and the nitrogen- or sulfur-containing carbonaceous material correspond to optimal conditions for the deposition of the metal single atoms on the water-soluble support because they are advantageous in controlling the mobility of the metal single atoms and forming coordinate covalent bonds between the water-soluble support and the deposited single atoms to suppress the diffusion of the metal single atoms. The use of anhydrous ethanol having low solubility for the water-soluble support as the dispersion solvent is effective in preventing a reduction in the amount of the metal single atoms loaded on a high concentration of the water-soluble support.

Although not explicitly described in the Examples section that follows, metal single-atom catalysts were prepared by varying the conditions defined in the method of the present invention; electrodes including the metal single-atom catalysts were fabricated; and the durability of the catalysts after 300 cycles of oxygen reduction reaction was investigated.

As a result, when the following conditions (i) to (x) were all met, no losses of the metal single atoms loaded on the supports were observed even after 300 cycles of oxygen reduction reaction, indicating high durability of the catalysts, unlike when other conditions and numerical ranges were employed: (i) the water-soluble support is dried under vacuum before step (a); (ii) the metal is selected from gold and silver; (iii) the water-soluble support is glucosamine; (iv) the support is carbon black; (v) the dispersion solvent is anhydrous ethanol; (vi) the deposition is performed by RF magnetron sputtering; (vii) the sputtering working pressure is between 0.3 and 0.7 mTorr; (viii) the intensity of the sputtering power is between 4 and 6 W; (ix) the deposition by sputtering is performed simultaneously with stirring of the water-soluble support such that the metal single atoms are uniformly deposited over the entire surface of the water-soluble support; and (x) in step (c), the dispersion containing the metal single-atom catalyst loaded on the carbon support is filtered, washed with distilled water, and dried to separate the metal single-atom catalyst loaded on the support.

If one or more of the conditions (i) to (x) were not met, losses of the metal single atoms on the supports were observed after 300 cycles of oxygen reduction reaction, indicating poor durability of the catalysts.

Another aspect of the present invention provides a single-atom catalyst including a carbon support and metal single atoms dispersed and loaded on the carbon support.

According to one embodiment, the metal may be selected from platinum, gold, palladium, cobalt, silver, rhodium, iridium, ruthenium, nickel, iron, copper, manganese, vanadium, chromium, molybdenum, yttrium, lanthanum, cerium, zirconium, titanium, tantalum, and osmium.

As already described in the method section above, the kind of the metal is merely illustrative and the majority of naturally occurring metals may be used to prepare the single-atom catalyst.

According to a further embodiment, the XRD pattern of the single-atom catalyst may not show peaks at 2θ angles other than 22±0.5° and 44±0.5°.

Typical metal catalysts have XRD patterns depending on their unique crystal structure. In contrast, the single-atom catalyst of the present invention has no crystal structure because the metal exists in the form of single atoms, which explains the reason why the single-atom catalyst does not have peaks other than the XRD peaks at 2θ of around 22° and 44° ascribed to the crystallization of the carbon support.

The following examples are provided to assist in further understanding of the present invention. However, these examples are provided for illustrative purposes only and the scope of the present invention is not limited thereto. It will be evident to those skilled in the art that various modifications and changes can be made without departing from the scope and spirit of the present invention.

Example 1

From 24 h before deposition, a glucose powder was dried at 70° C. and $10^{-2}$ Torr to remove surface moisture. 40 g of the glucose was placed in a stirrer and the stirrer was mounted in a main chamber of a sputtering system. A platinum (Pt) target was mounted in an RF magnetron sputtering gun and a vacuum was created using a vacuum pump. The initial vacuum was maintained at $10^{-6}$ Torr. The working pressure for deposition was set to 0.5 mTorr using argon (Ar) gas. After the stirrer was started, platinum single atoms were deposited on the glucose surface by sputtering. The sputtering power was set to 5 W and the deposition was performed for 3 h.

30 mg of a carbon support (Vulcan XC-72R) was placed in ethyl alcohol and was evenly dispersed by sonication for 60 min. 10 g of the glucose deposited with the platinum single atoms was added to the carbon-dispersed ethyl alcohol, followed by stirring at room temperature for about 12 h. After completion of the stirring, the solution was filtered through a filter paper, washed several times with 2 L of distilled water to remove residual glucose, and evaluated to dryness in a vacuum oven at 60° C. for >2 h to completely remove water, affording a carbon-supported platinum single-atom catalyst.

Comparative Example 1

A carbon-supported platinum nanoparticle catalyst (Pt/C) was synthesized in the same manner as in Example 1, except that the sputtering power was changed to 20 W and the internal working pressure of the sputtering chamber was changed to 5 mTorr.

Test Example 1

Transmission Electron Microscopy

Figure 3:
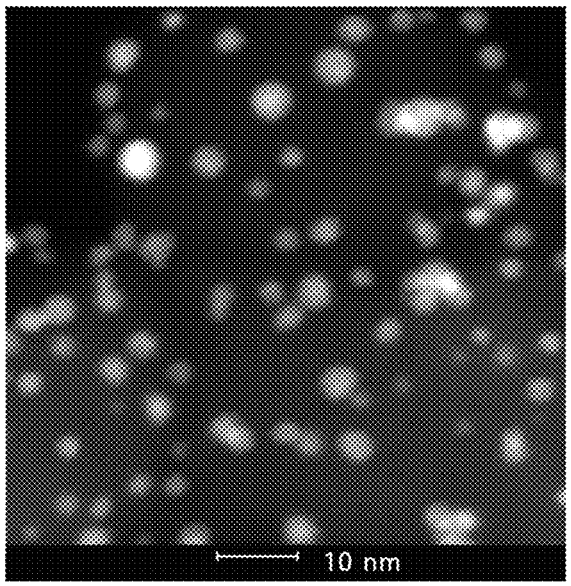
FIG. 3 shows transmission electron microscopy images of a carbon-supported platinum single-atom catalyst prepared in Example 1 and a carbon-supported platinum nanoparticle catalyst prepared in Comparative Example 1.
Figure 3:
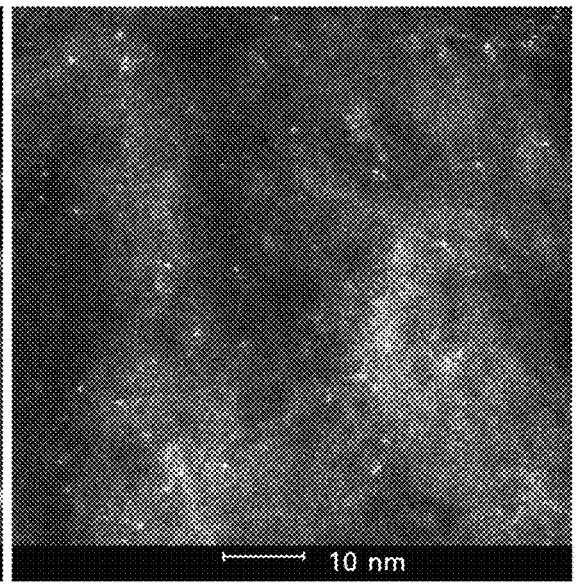
Figure 4:
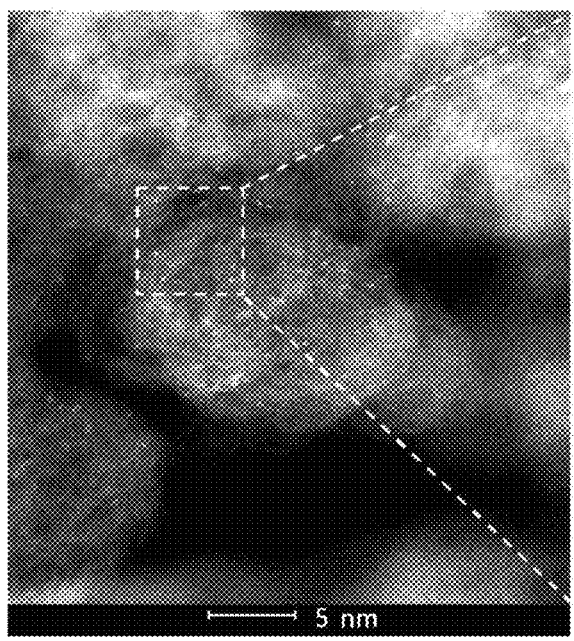
FIG. 4 is a higher magnification transmission electron microscopy image of the carbon-supported platinum single atom catalyst shown in FIG. 3.
Figure 4:
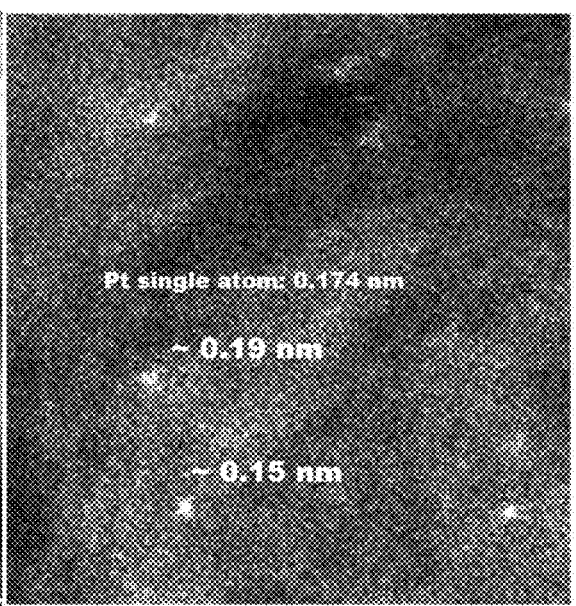

The structures of the carbon-supported platinum single atom catalyst prepared in Example 1 and the carbon-supported platinum nanoparticle catalyst prepared in Comparative Example 1 were analyzed by transmission electron microscopy (TEM). FIG. 3 shows the transmission electron microscopy images of the carbon-supported platinum single-atom catalyst of Example 1 and the carbon-supported platinum nanoparticle catalyst of Comparative Example 1. The carbon-supported platinum nanoparticle catalyst of Comparative Example 1 was found to have a size of 3-5 nm and took the form of platinum nanoparticles used in general electrochemical catalysts. The bright white points in the image of the carbon-supported platinum single-atom catalyst (Example 1) represent the platinum single atoms and their size were observed to be much smaller than the size of the platinum nanoparticles in the image of the carbon-supported platinum nanoparticle catalyst (Comparative Example 1). FIG. 4 is a higher magnification transmission electron microscopy image of the carbon-supported platinum single atom catalyst shown in FIG. 3. The bright white points had a size of ca. 0.15-0.19 nm, which was similar to the known size (0.174 nm) of platinum single atoms. That is, each of the white points represents a single platinum atom. Considering that the only differences between Example 1 and Comparative Example 1 were the sputtering conditions, it can be concluded that the sputtering power and the working pressure should be maintained at 1-10 W and 5 mTorr or less for the deposition of single atoms.

Test Example 2

X-Ray Diffraction Analysis

Figure 5:
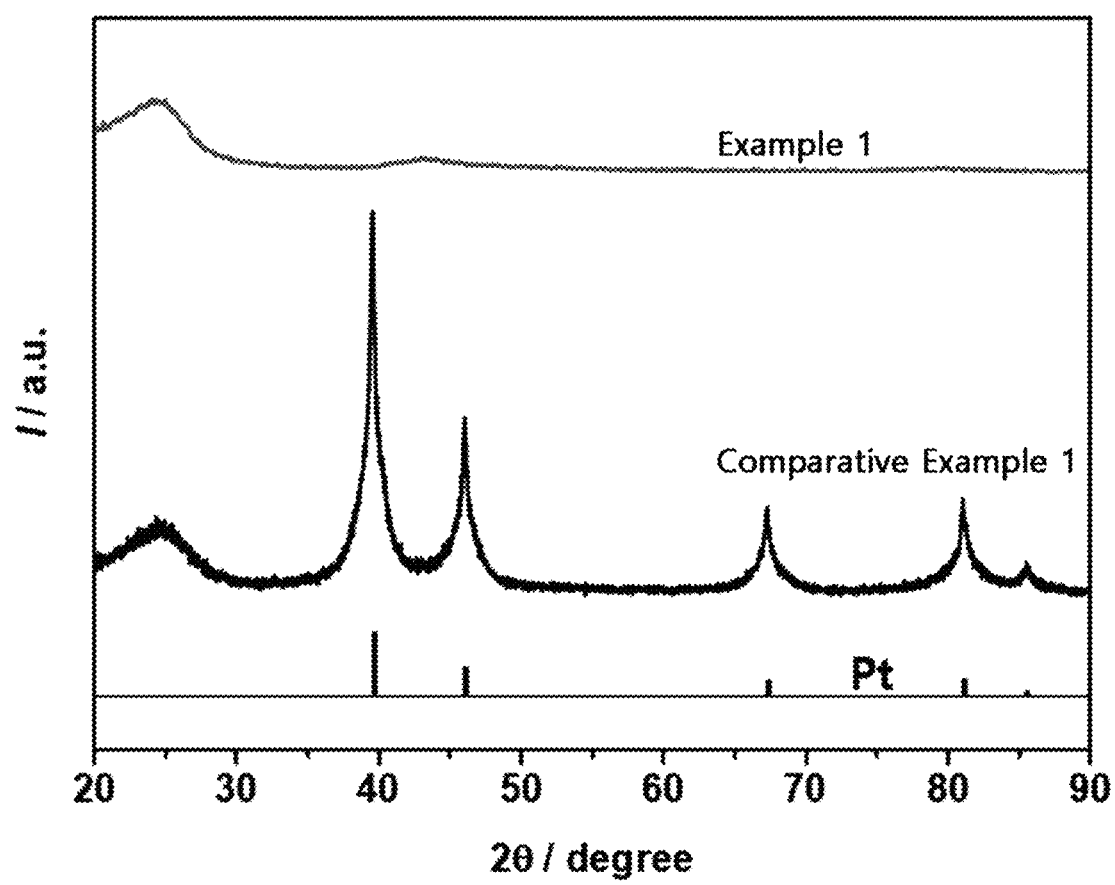
FIG. 5 shows the results of X-ray diffraction analysis for a carbon-supported platinum single-atom catalyst prepared in Example 1 and a carbon-supported platinum nanoparticle catalyst prepared in Comparative Example 1.

The crystallinities of the platinum single atoms of the carbon-supported platinum single-atom catalyst (Example 1) and the platinum nanoparticles of the carbon-supported platinum nanoparticle catalyst (Comparative Example 1) were analyzed by X-ray diffraction (XRD). FIG. 5 shows the results of X-ray diffraction analysis for the carbon-supported platinum single-atom catalyst of Example 1 and the carbon-supported platinum nanoparticle catalyst of Comparative Example 1.

The platinum nanoparticles were found to have a face centered cubic (FCC) structure, which is the basic crystal structure of platinum typically found in platinum metal or nanoparticles. As revealed from the XRD analysis, however, the platinum single atoms did not show any crystal structure associated with platinum other than the XRD peaks at 20 of around 22° and 44° ascribed to the crystallization of the carbon. These results suggest that the platinum existing in the form of single atoms had no crystal structure. TEM is a very local analytical technique whereas XRD shows the overall analytical results for samples. Taken together, the XRD results suggest that most of the platinum atoms present on the carbon existed in the form of single atoms and the inventive synthetic method ensured uniform support of the platinum single atoms on the carbon.

In conclusion, the method of the present invention uses a minimal amount of chemicals and is thus environmentally friendly compared to conventional chemical and/or physical methods. In addition, the method of the present invention enables the preparation of a single-atom catalyst in a simple and economical manner without the need for further treatment such as acid treatment or heat treatment. Furthermore, the method of the present invention is universally applicable to the preparation of single-atom catalysts irrespective of the kinds of metals and supports, unlike conventional methods that suffer from very limited choices of metal materials and supports. Therefore, the method of the present invention can be widely utilized to prepare various types of metal single-atom catalysts. All metal atoms in the metal single-atom catalyst of the present invention can participate in catalytic reactions. This optimal atom utilization achieves maximum reactivity per unit mass and can minimize the amount of the metal used, which is very economical.

Although the present invention has been described herein with reference to the foregoing embodiments, these embodiments do not serve to limit the scope of the present invention. Those skilled in the art will appreciate that various modifications are possible, without departing from the spirit of the present invention. Accordingly, the scope of the present invention should be defined by the appended claims.

What is claimed is:

1. A method for preparing a metal single-atom catalyst, comprising:

drying a water-soluble support under vacuum;
    depositing metal single atoms on the water-soluble support, wherein the depositing step is performed by sputtering;
    dispersing a support in a dispersion solvent and obtaining a support-dispersed solvent;
    adding the water-soluble support deposited with the metal single atoms to the support-dispersed solvent and stirring to obtain a solution containing a metal single-atom catalyst loaded on the support; and
    separating the metal single-atom catalyst from the solution,
    wherein a metal of the metal single atoms is gold or silver,
    wherein the water-soluble support is glucosamine,
    wherein the support is carbon black,
    wherein the dispersion solvent is anhydrous ethanol,
    wherein the sputtering is radio frequency (RF) magnetron sputtering, a sputtering working pressure is between 0.3 and 0.7 mTorr, an intensity of sputtering power is between 4 and 6 W, and a power density of the sputtering is between 0.05 and 0.5 W/cm$^2$,
    wherein the depositing step by the sputtering is performed simultaneously with stirring the water-soluble support such that the metal single atoms are deposited uniformly over an entire surface of the water-soluble support,
    wherein, in the separating step, the solution containing the metal single-atom catalyst loaded on the carbon support is filtered, washed with distilled water, and dried to separate the metal single-atom catalyst loaded on the support.

* * * * *